United States Patent [19]

Weaver

[11] Patent Number: 4,727,742
[45] Date of Patent: Mar. 1, 1988

[54] CRIMPING TOOL FOR FIBER OPTIC SPLICE CONNECTOR

[75] Inventor: David B. Weaver, Landisburg, Pa.

[73] Assignee: AMP Incorporated, Harrisburg, Pa.

[21] Appl. No.: 831,945

[22] Filed: Feb. 24, 1986

[51] Int. Cl.⁴ .................. B21D 7/06; B23P 11/00
[52] U.S. Cl. ............................. 72/402; 72/410; 72/450; 29/237; 29/243.52
[58] Field of Search .......... 72/402, 410, 409, 407, 72/421, 450; 29/237, 243.52, 283.5, 751, 761

[56] References Cited

U.S. PATENT DOCUMENTS

| | | | |
|---|---|---|---|
| 758,195 | 4/1904 | Schweinert et al. | 72/402 |
| 1,664,527 | 4/1928 | Poole | 29/243.52 |
| 3,205,568 | 9/1965 | Stull | 72/410 |
| 4,027,518 | 6/1977 | Ribback | 72/407 |
| 4,416,506 | 11/1983 | Johnson et al. | 29/283.5 |
| 4,601,191 | 7/1986 | Ikeda et al. | 72/402 |

FOREIGN PATENT DOCUMENTS

83552  5/1920  Switzerland ................... 72/450

Primary Examiner—Daniel C. Crane
Attorney, Agent, or Firm—William B. Noll

[57] ABSTRACT

Crimping apparatus for butt splicing two optical fibers in a connector requiring application of both radial and axial force comprises a frame, a workstation for holding the connector, a pair of radial die sets, and a pair of axial die sets. A disk journaled to the frame beneath the workstation has an integral ring-like member connected to respective die sets by four toggle links at ninety degree intervals. Rotating the disk causes the die sets to converge on a connector at the workstation.

6 Claims, 13 Drawing Figures

CRIMPING TOOL FOR FIBER OPTIC SPLICE CONNECTOR

BACKGROUND OF THE INVENTION

The present invention relates to an apparatus for crimping a fiber optic butt splice connector requiring application of radial and axial force.

U.S. Pat. No. 4,435,038 discloses a fiber optic butt splice connector of the type comprising a sleeve and a deformable support member therein, the support member having a plurality of elongate parallel ribs defining a fiber-receiving passage therebetween. Termination is accomplished by inserting end portions of two fibers into the passage and applying a radial crimp to compress the support member to axially align the fibers. Interstitial spaces between the ribs are closed up during crimping such that the support body is deformed substantially only radially.

Control of space between the end faces of the optic fiber is extremely critical; recent studies have shown that minimum transmission loss occurs when the faces abut. However, the above described connector does suffer sufficient axial creep to separate the end faces during radial crimping. Accordingly, the connector disclosed in U.S. Pat. No. 4,435,038 has been augmented by the addition of plug members inserted in the ends of the sleeve. During crimping, axial force must be applied to the plugs to prevent axial creep of the support member therebetween and thus maintain the end faces in abutment. Concomitant radial crimping secures the sleeve to the plug to prevent subsequent creep. The original tool designed for applying this improved connector is a cumbersome hydraulic apparatus, presenting the need for a simple tool for field use.

U.S. Pat. No. 4,416,506 discloses apparatus for use in butt splicing two optical fibers in a connector of the type comprising crimping collars on a deformable sleeve having three rods about a fiber-receiving passage therein. The apparatus comprises a frame, a workstation for holding the connector stationary relative to the frame, and a pair of axial die sets movable toward and away from the workstation. The crimping collars exert radial force on the sleeve, obviating the need for radial die sets.

SUMMARY OF THE INVENTION

According to the invention, crimping apparatus is provided for use in butt splicing two optical fibers in a connector of the type having a sleeve, a deformable fiber support member, and end plugs which prevent axial creep. The apparatus comprises a frame, a workstation, a pair of radial die sets movable toward and away from the workstation on a first linear path, a pair of axial die sets movable toward and away from the workstation along a second linear path orthogonal to the first path, and a ring-like member situate about the die sets and rotatable relative to the frame. Four toggle links at approximate ninety degree intervals about the ring-like member have outer ends pivotably attached to the ring-like mmber and inner ends pivotably attached to respective die sets, the links extending at like angles to the ring-like member. Upon rotating the ring-like member in a first direction, the die sets in each pair will move toward each other, whereby a butt splice connector requiring radial and axial crimping can be applied to the fibers.

The axial die sets prevent creep of the deformable support member, which creep could separate the end faces of the fibers. The radial die sets compress the sleeve about the support member, crimp the sleeve to the plugs, and further crimp the plugs to the cable jacket to provide strain relief. The primary advantage of the tool is in providing means for applying the improved fiber optic connector.

BRIEF DESCRIPTION OF THE DRAWINGS

FIG. 8 is an end section taken along line 9—9 of FIG. 8, albeit with top plate in place;

DETAILED DESCRIPTION OF THE PREFERRED EMBODIMENT

Figure 1:
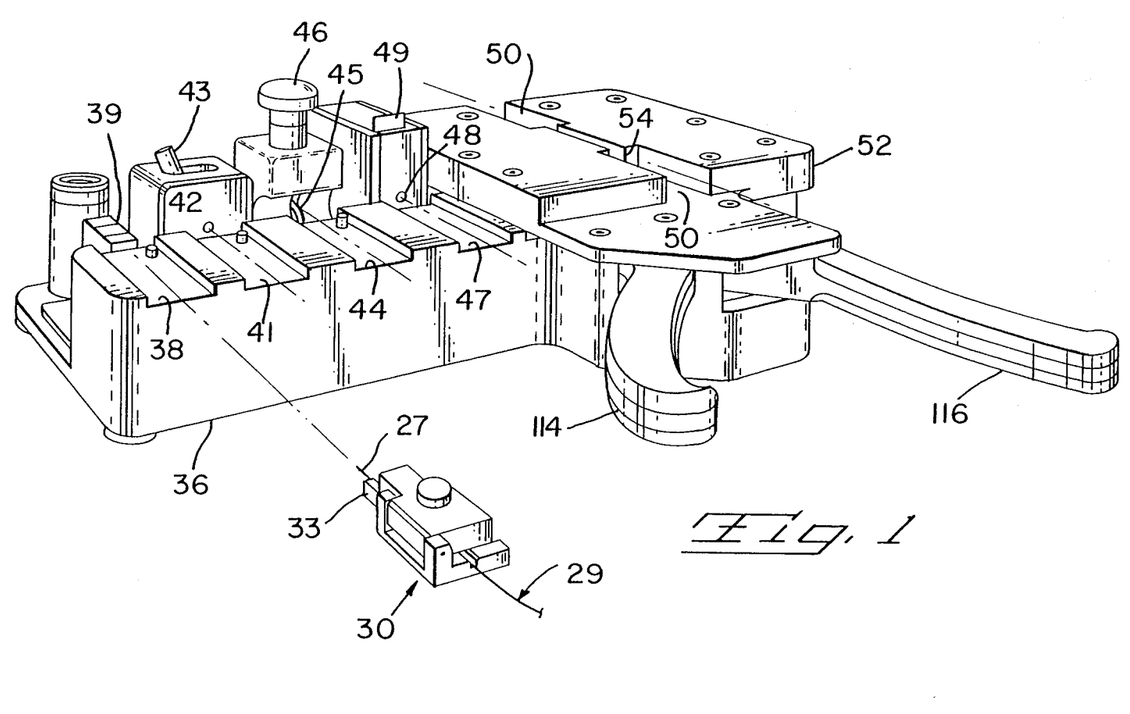
FIG. 1 is a perspective of the end preparation and crimping apparatus.
Figures 1A, 2:
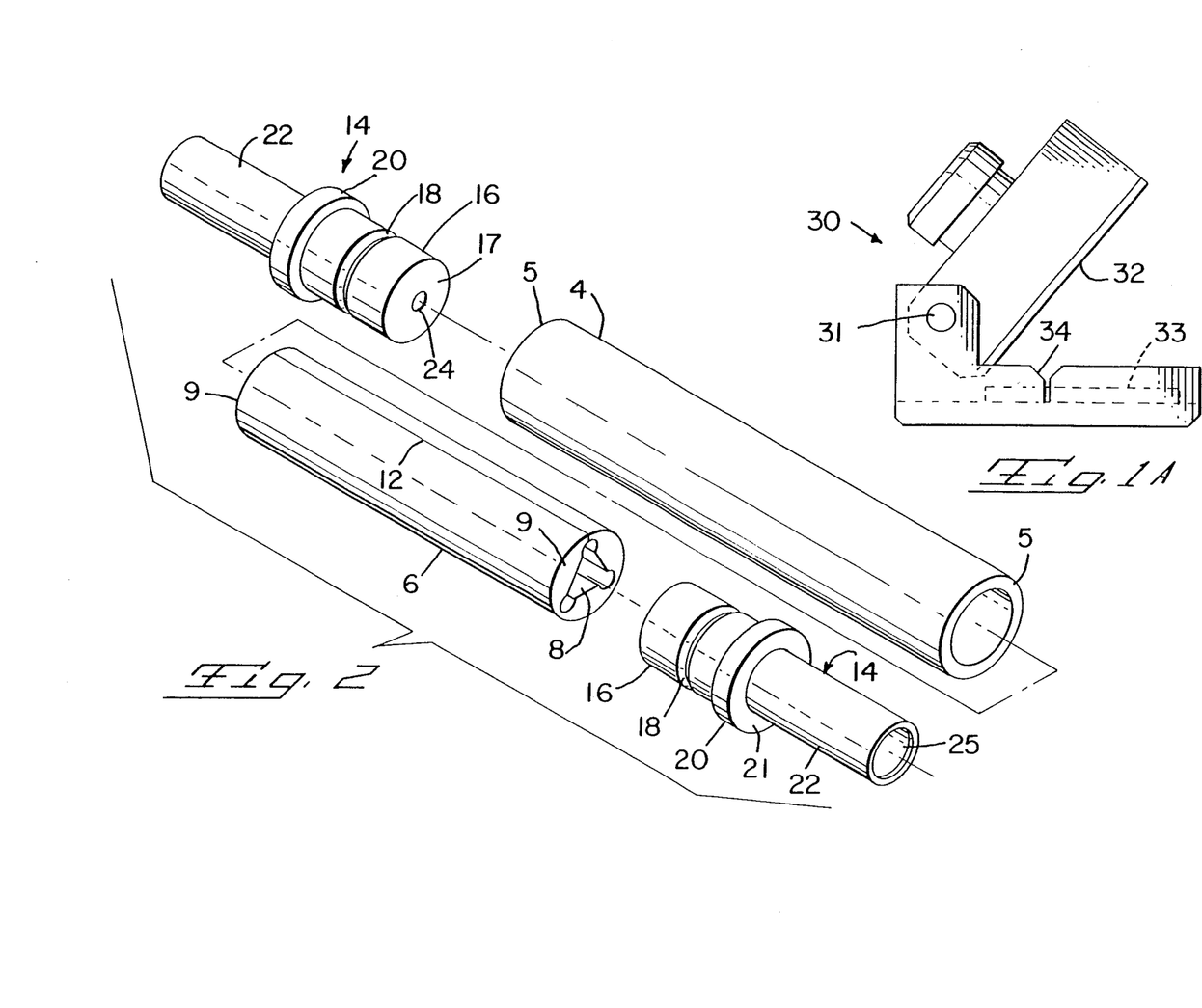
FIG. 1A is an end view of the clamping block.
FIG. 2 is an exploded perspective of the connector.

Referring to FIG. 1, apparatus comprises a fiber clamp 30 having an exposed optical transmission fiber 27 on platform 33 and a jacketed portion 29 extending oppositely. The clamp 30 is first placed at positioning station 38 where the fiber 27 is positioned according to scribe marks on bench 39. The fiber is received in groove 34 and magnetic pad 32 pivoted at pin 31 clamps the fiber 27 against platform 33 (FIG. 1A). The clamp 30 is then placed at scoring station 41 with the fiber 27 extending into passage 42, where the fiber is scored by moving handle 43. The clamp 39 is then placed at cleaving station 44 with fiber 27 extending into passage 45; tension is applied by depressing handle 46 and a cleavage propagation from the score mark ensues. The clamp 30 is then placed at cleaning station 47 with fiber 27 being received in passage 48 to abut stick tape 49, which removes any residue. Index matching material in liquid form is then applied. The preparation process is then repeated with another clamp 30, and the clamps 30 are placed at respective terminating stations 50, the fibers 27 being received axially in opposite ends of a connector placed at work station 54. The stations 50, 52 are machined in top plate 52, which is fixed to frame 36. Operative terminating mechanisms are actuated by rotating handle 116 toward handle 114, which is fixed to frame 36.

Figure 2A:
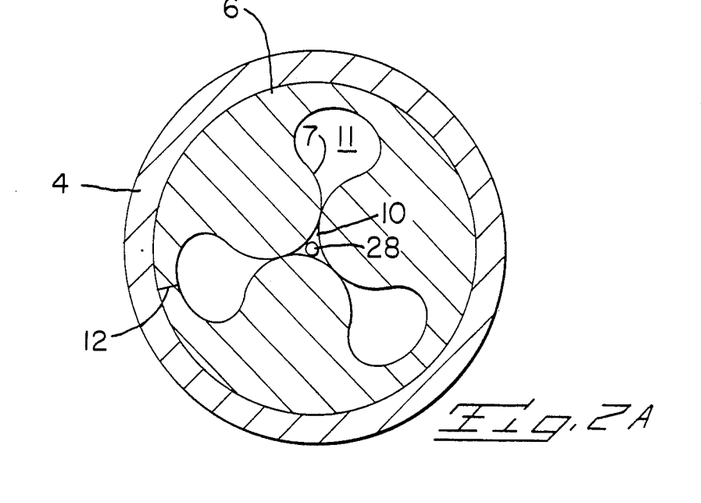
FIG. 2A is an end section of the connector prior to crimping.

The terminating apparatus of the present invention is especially adapted for the connector shown in the exploded perspective of FIG. 2. The connector comprises a tubular sleeve 4 which receives a fiber support member 6 between ends 5. The support member 6 is formed as a plate-like member as shown in FIG. 1 of U.S. Pat. No. 4,435,038, subsequently being folded so that opposed ends meet at seam 12. Lead-in chamfers 8 at opposed ends 9 facilitate insertion of fiber 27 into passage 10 defined between ribs 7 (FIG. 2A). Plug members 14 each have a compression portion 16 having an inside face 17 received against a respective end 9 of support member 6. Each compressive portion 16 has an annular groove 18 to permit crimping the sleeve 4 therein, and a collar 20 with a shoulder 21 for applying axial force to the plug members 14. Each plug member 14 has a strain relief portion 22 with a lead-in 25 to bore 24 which closely receives the fiber. The lead-in 25 is sized to closely accommodate the fiber jacket so that portion 22 may be readily crimped thereto.

Figures 3, 4:
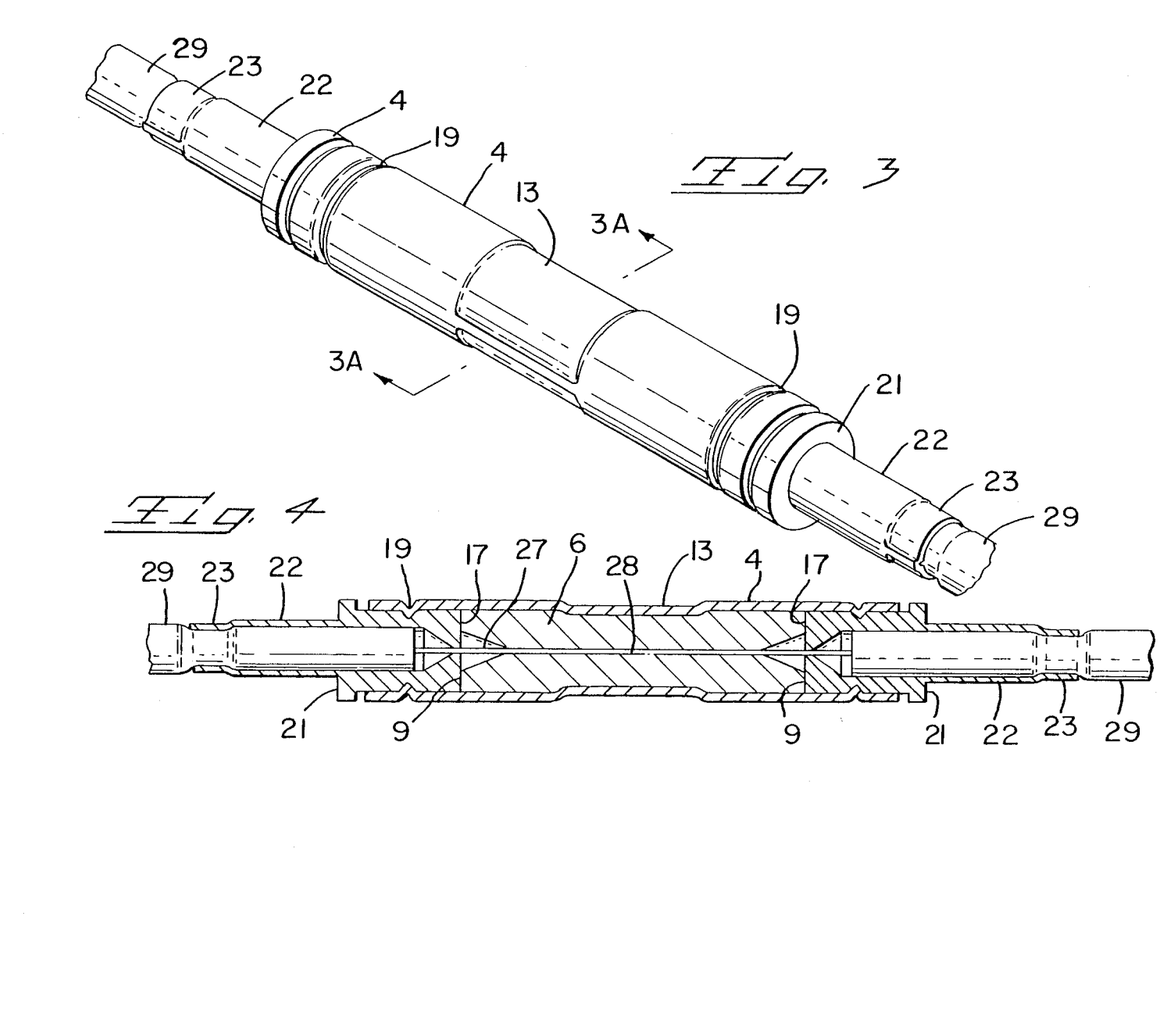
FIG. 3 is a perspective of the crimped connector.
FIG. 4 is a side section of the crimped connector.
Figure 3A:
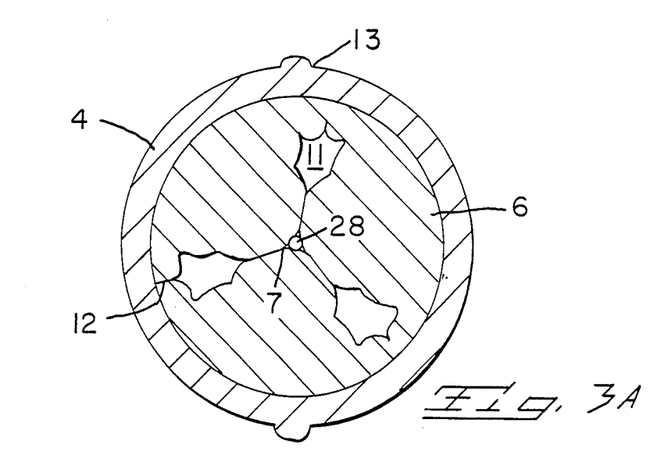
FIG. 3A is an end section of the connector after crimping.

FIGS. 3 and 4 depict the fully assembled connector subsequent to crimping at crimps 13, 19, 23. The crimp 13 compresses the deformable sleeve 6 radially to close up the interstitial spaces 11, likewise constricting the fiber passage 10 so that axial alignment of end faces 28 is assured (FIG. 3A). Force applied at opposed shoulders 21 prevent axial creep which could separate the end faces 28, and crimps 19 maintain the inside faces 17 of the plugs against opposite ends 17 of the support member 6. Strain relief crimps 23 secure portion 22 to fiber jacket 29, thus protecting the fiber 27 from stress.

Note, also, in conjunction with FIGS. 2 to 4, the preferred composition of various components of the connector sleeve 4 is copper, support member 6 is aluminum, and end plugs 14 are of brass.

Figure 5:
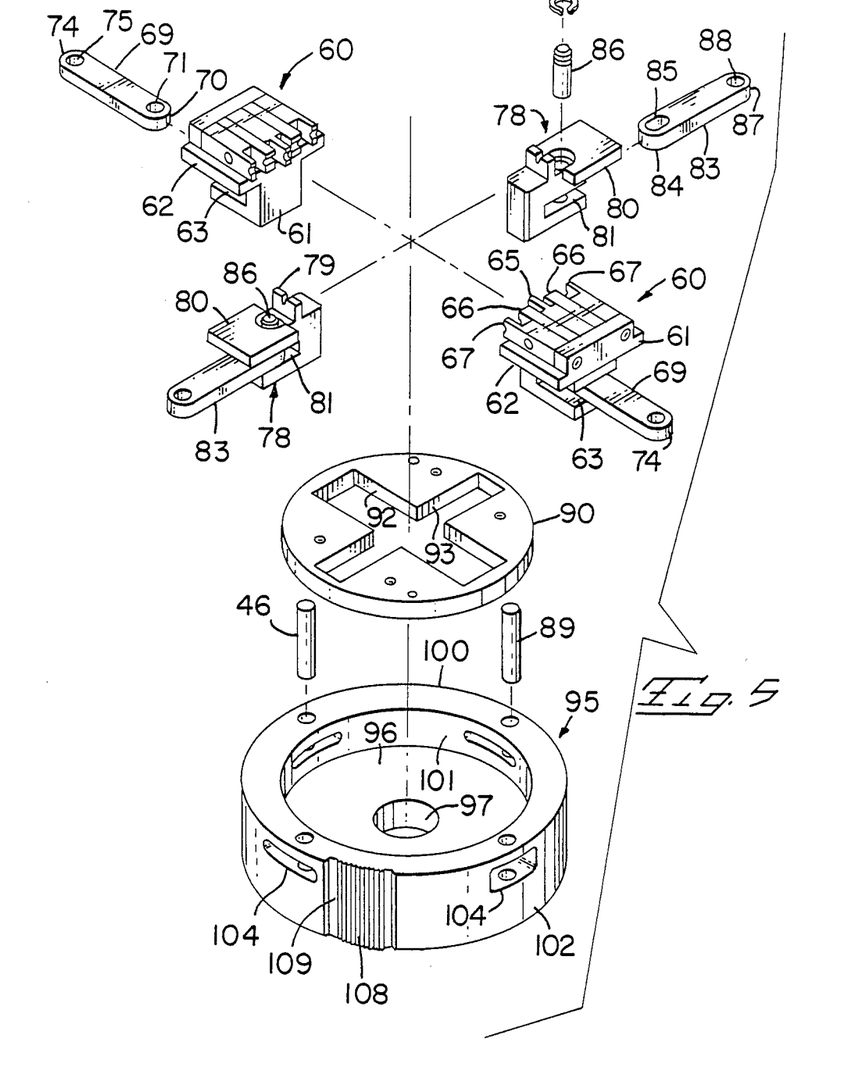
FIG. 5 is an exploded perspective of the crimping mechanism.
Figure 6:
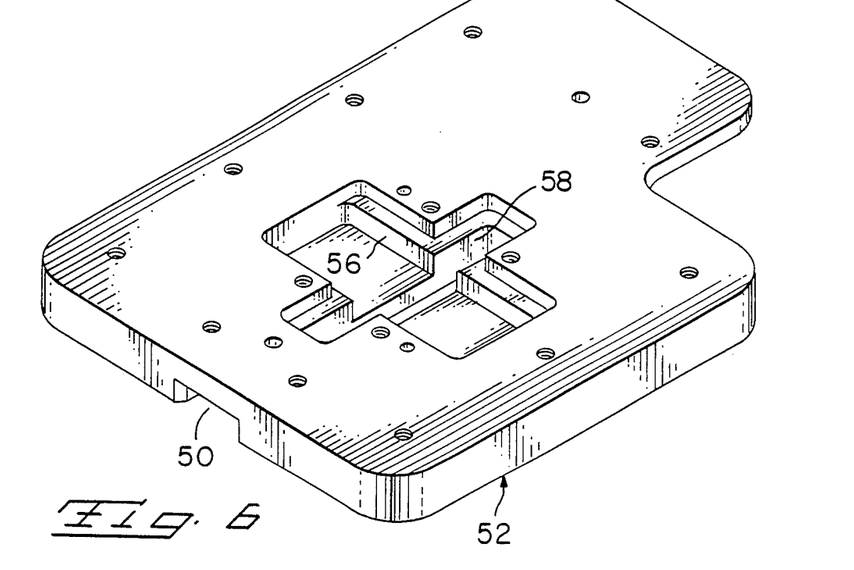
FIG. 6 is a perspective of the top plate.

FIG. 5 details the die sets 60, 78 and drive means for same which effects crimping. Each radial die set 60 has an integral platform 62 and yoke 63, with dies 65, 66, 67 fixed to the platform 62. Opposed primary dies 65 effect the primary crimp 13, while opposed pairs of secondary dies 66 effect secondary crimp 19, and opposed pairs of strain relief dies 67 effect crimps 23. Each axial die set 78 has a cradle 79 which receives a respective strain relief portion 22, and further has a platform 80 and yoke 81. As radial crimping progresses, the cradle 79 bear on shoulders 21. Guide plate 90 has a radial guide slot 92 which receives opposed yokes 61 and an orthogonally oriented axial guide slot 93 which receives opposed yokes 81, the edges of platforms 67, 80 riding on the top of plate 90. The guide plate 90 is fixed to top plate 52 with the dies 65, 66, 67 moving in channel 56 and cradles 79 moving in channel 58 (FIG. 6). The top plate 52 is fixed to frame 36 (FIG. 1) so that die sets 60, 78 are constrained to movement in two orthogonal directions.

Disk drive 95 comprises a base 96 with center journal 97 and an integral ring-like member 100 coaxial thereto. The ring-like member has an inside surface 101 and an outside surface 102 with four slots 104 extending therebetween, the slots 104 being intersected by respective bores 105 at ninety degree intervals. Radial toggle links 69 each have an inner end 70 with hole 71 pivoted in a yoke 63, and an outer end 74 with hole 75 pivoted on a pin 76 in slot 104. Axial toggle links 83 each have an inner end 84 with elongate hole 85 pivoted on a pin 86 in yoke 81, and an outer end 87 with a hole 88 pivoted on a pin 89.

Figure 7:
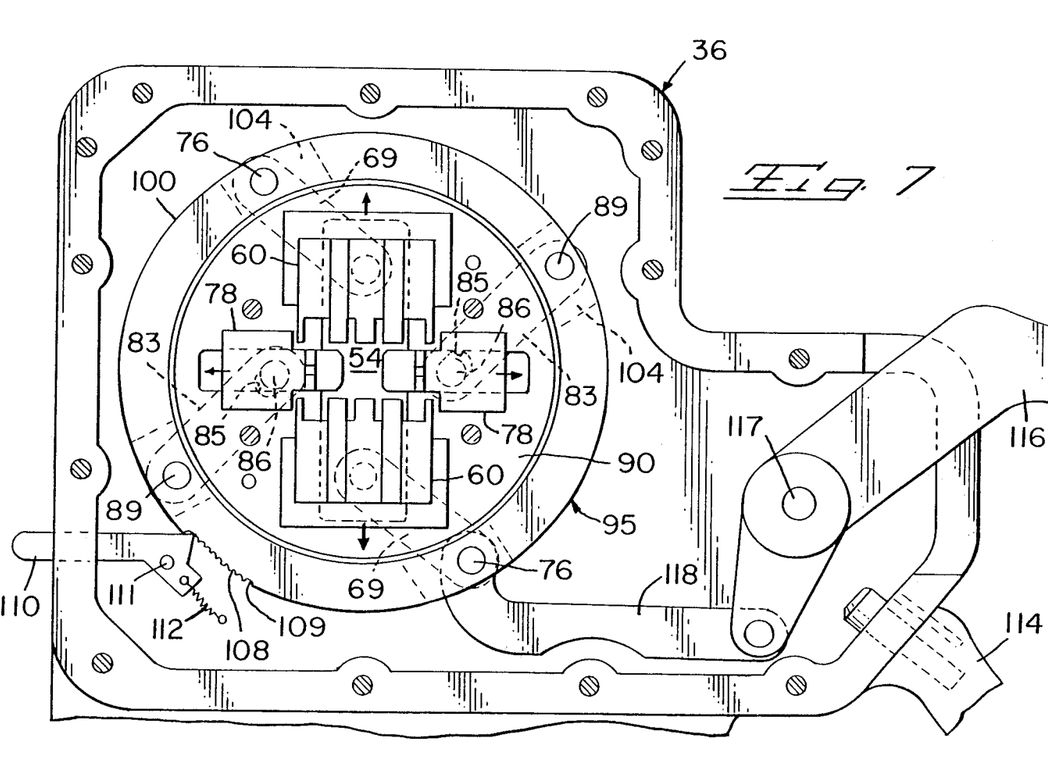
FIG. 7 is a plan view of the crimping apparatus, top plate removed, prior to crimping motion.

FIG. 7 is a plan view of the crimping apparatus, with top plate 52 removed, prior to crimping. Links 69, 83 extend from the ring-like member 100 at line angles, the links 69 journaled to pins 76, the links 83 journaled to pins 89. Drive handle 116 pivots about pin 117 fixed in frame 36, and drive connecting link 118 which is journaled to a pin 76 to effect rotation of ring-like member 100. This rotates links 69, 83 which causes respective die sets 60, 78 to converge toward workstation 54, but note that elongate holes 85 will cause delayed movement of the axial die sets 78. The outer surface 102 of member 100 has shallow gooves 108 flanked by a pair of deep grooves 109, the spring loaded pawl 110 cooperating with grooves 108 to prevent the member 100 from returning until the last groove 109 is reached.

Figure 8:
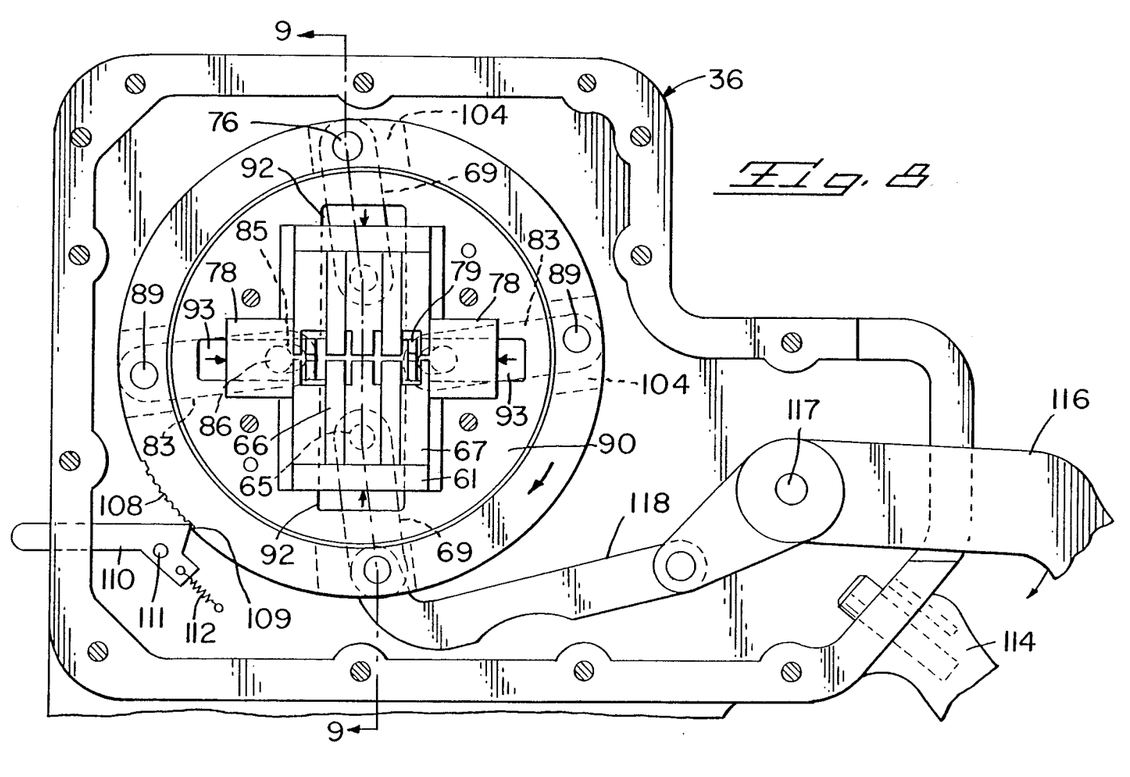
FIG. 8 is a plan view of the crimping apparatus, top plate removed, after crimping motion.

Referring to FIG. 8, the handle 116 has been moved fully toward stationary handle 114 to complete the crimp cycle, the toggle links 69 rotating to advance each radial die set 60 about 0.20 inch toward the opposed radial die set, which axial toggle links 83 rotate to advance axial die sets 78. Note that the elongate slots 85 result in lost motion of the axial die sets 78, each of which moves only 0.025 inch. The pawl 110 is in the final large groove 109, so that member 100 will rotate back when handle 116 is released, permitting the terminated fiber optic splice connector (FIG. 3) to be removed.

Figure 9:
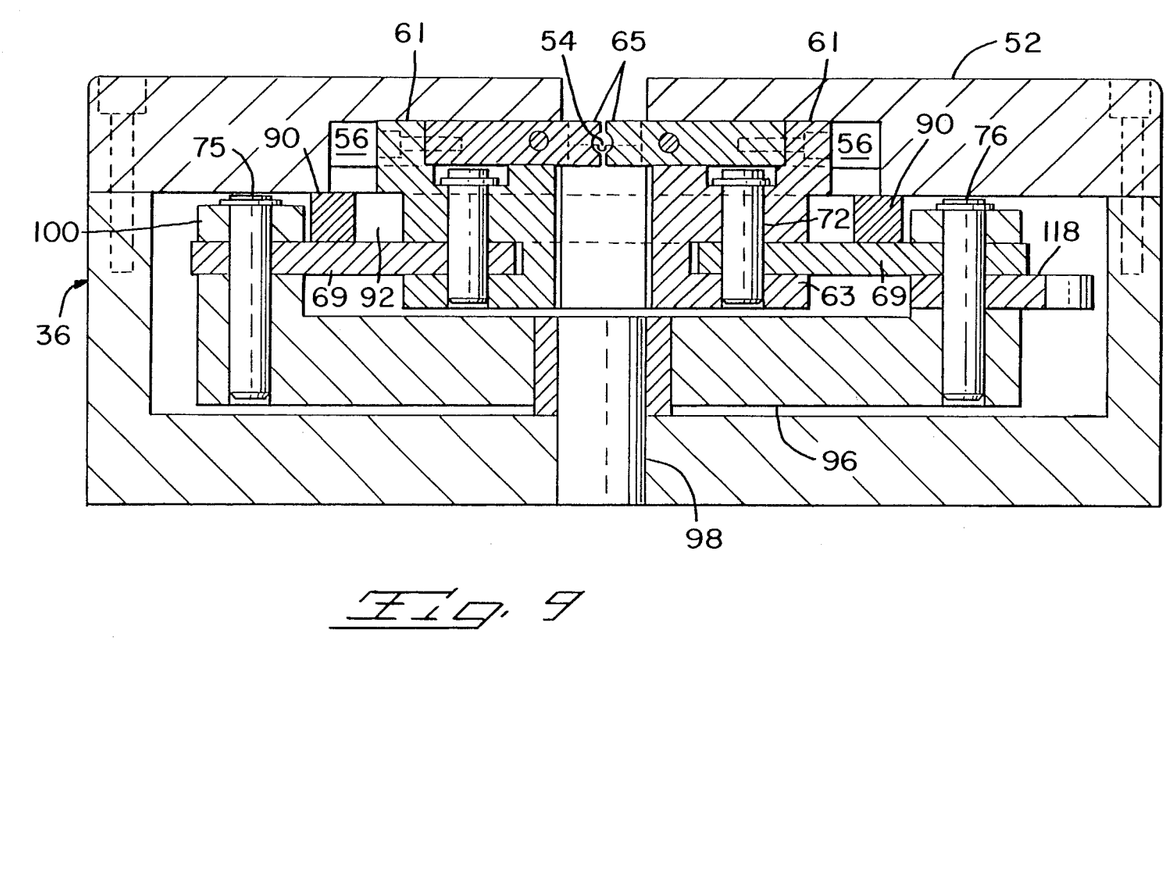
Figure 10:
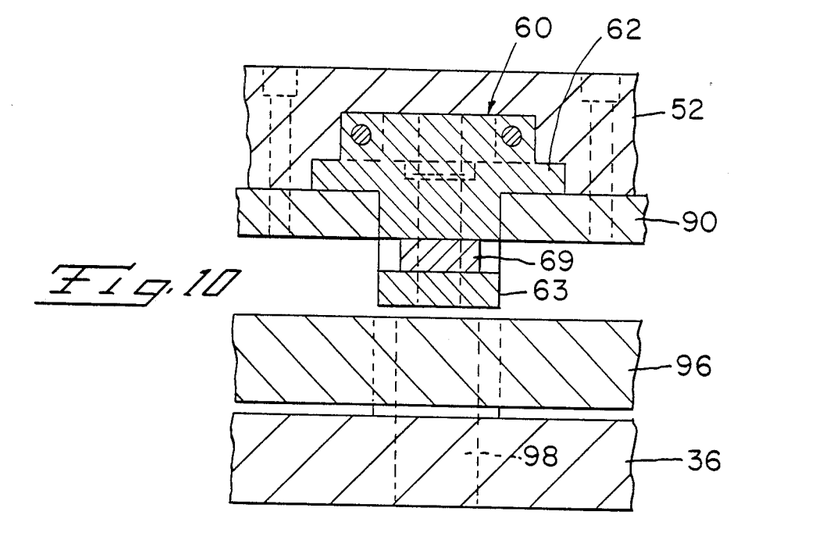
FIG. 10 is a side section taken along line 10—10 of FIG. 9.

FIG. 9 shows the primary dies 65 fully advanced on work station 54, the dies 65 being seated on respective holders 61 which are driven by links 69 when disk 96 is rotated on axle 98 by action of link 118. Guide plate 90 fixed to top plate 52 contains the die sets 60, 83 for sliding movement in orthogonal directions relative to frame 36, as also shown in FIG. 10.

The foregoing is exemplary and not intended to limit the scope of the claims which follow.

I claim:

1. Crimping apparatus for use in butt splicing two optical fibers in an connector of the type comprising a sleeve and deformable fiber support means therein, said support means having a plurality of elongate parallel ribs situate radially about a fiber-receiving passage, said apparatus comprising:

a frame, a workstation for holding said connector in a first plane and stationary relative to said frame, where said workstation comprises a pair of radial die sets movable toward and away from said workstation in a second plane and parallel to said first plane, which sets apply pressure in a radial direction to said connector, a pair of axial die sets movable toward and away from said workstation in said second plane, which axial die sets have a different configuration than said radial die sets and configured to accommodate the axial ends of the connector and apply axial compressive pressure to said connector, a die set holder comprising a ring-like member rotatable relative to said frame, a guide plate having radial slots therein receiving said die sets, and four toggle links at approximate ninety degree intervals about said ring-like member, each toggle link having an outer end pivotably attached to said ring-like member and an inner end pivotably attached to a respective die set, said links extending at line angles to said ring-like member, whereby upon rotating said ring-like member in a first direction, the die sets in each pair will move toward each other within its respective said radial slot, and upon rotating said ring-like member in a second, opposite direction, the die sets in each pair will move away from each other.

2. Crimping apparatus as in claim 1 for use with a connector having plug members in opposite ends of said sleeve, each plug member having an inside face and an opposed shoulder, said inside face being disposed toward said support means, said axial die sets comprising a pair of cradles which receive respective plugs therein, said cradles being disposed to bear against respective shoulders of a connector placed at said workstation when said ring-like member is rotated in said first direction.

3. Crimping apparatus as in claim 1 wherein said radial die sets each comprise a primary radial crimping die opposite the primary die of the other radial die set, said primary dies being disposed to crimp the sleeve against the support means at the midpoint of a connector placed at said workstation.

4. Crimping apparatus as in claim 1 for use with a connector having plug members in opposite ends of said sleeve, each plug member having a circumferential groove within said sleeve, said radial die sets each comprising a pair of secondary radial crimping dies directly opposed from the secondary dies of the other radial die set, said secondary dies being disposed to crimp the sleeve into the grooves on respective plugs of a connector at said workstation.

5. Crimping apparatus as in claim 1 for use with a connector having plug members in opposite ends of said sleeve, each plug member having an axial bore therethrough for receiving a fiber in axial alignment with said passage, each plug member having a strain relief portion disposed outside said sleeve, the bore through each said strain relief portion being sized to receive the jacket of a fiber optic cable, said radial die sets each comprising a pair of strain relief dies directly opposed from the strain relief dies of the other relief die set, said strain relief dies being disposed to crimp the strain relief portions of respective plugs of a connector at said workstation.

6. Crimping apparatus as in claim 1 wherein the toggle links attached to said axial die sets each are pivoted by a pin in an elongate hole, whereby each axial die set suffers lost motion when said ring-like member is rotated.

* * * * *